J. W. Hodges,
Steam Trap.
No. 103,184. Patented May 17, 1870.
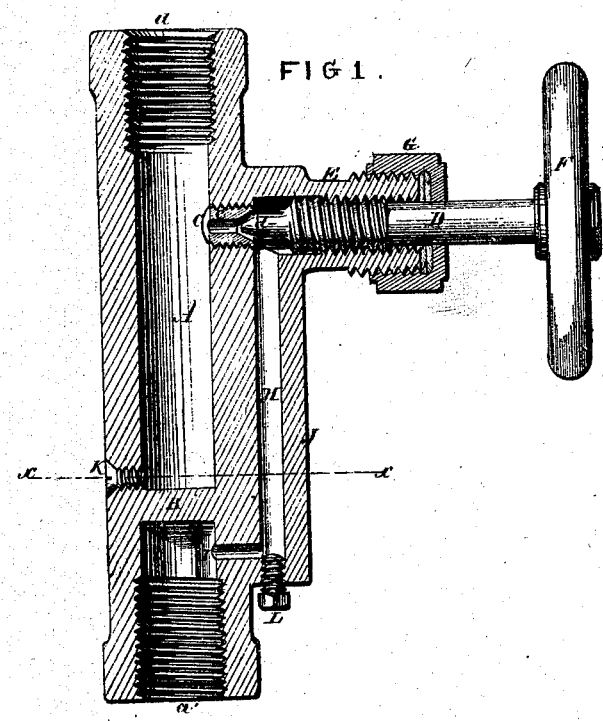
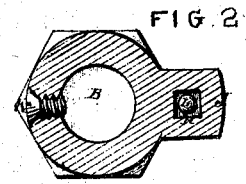
Witnesses
W. B. Deming
J. Scheitlin
J. W. Hodges
By Knight Bros.
Attorneys

United States Patent Office.

JAMES WILSON HODGES, OF BALTIMORE, MARYLAND.

Letters Patent No. 103,184, dated May 17, 1870.

IMPROVEMENT IN STEAM-TRAPS.

The Schedule referred to in these Letters Patent and making part of the same.

I, JAMES WILSON HODGES, of the city of Baltimore, in the State of Maryland, have invented an Improved Steam-Trap, which is described as follows:

Nature and Objects of the Invention.

My invention relates especially to that class of steam-traps which is employed to prevent the escape of steam, while permitting the discharge of water of condensation from coils or other radiators, which are heated by steam.

The improvement consists in constructing the main pipe, at or near its discharge end, or at any point where it is desired to discharge the water and trap the steam, with a diaphragm or partition to arrest the flow, and some distance back of said partition a lateral opening, which is guarded by a screw, plug, or valve, and communicates with a duct by which any water or steam which passes the valve is carried around the partition and delivered into the discharging end of the main pipe.

Suitable plugs are provided for the purpose of removing any sediment or impurities which may collect upon or against the partition. In the main pipe or at the lower part of the connecting-duct, or instead of one or both of these plugs, cocks may be employed, which, in addition to the functions already stated, may be employed to draw water of condensation from the pipes or permit a slight escape of steam.

General Description with Reference to the Drawings.

In the accompanying drawings—

Figure 1 represents a longitudinal section of my improved steam-trap.

Figure 2 is a transverse section of the same, at x x, fig. 1.

Similar letters of reference indicate like parts in both views.

A represents a portion of a steam-coil, provided at its ends, a and a', with screw-threads for coupling, a being its receiving and a' its discharging end.

Between these ends the pipe is divided by a permanent partition, B.

At some distance from the partition B, toward the receiving end of the pipe, is a lateral opening, C, which is preferably lined with a bushing, c, of brass, or Babbitt or other metal suitable to form a valve-seat, upon which works a valve, d, formed on the end of a screw-plug, D, which works within a threaded socket, E, and is rotated by means of a hand-wheel, F, in customary manner.

G may represent a cap and packing of common form.

H represents a duct, leading from the aperture at C to another aperture, I, which communicates with the main pipe on the discharging side of the partition B.

The said duct is formed in a projection, J, on the side of the main pipe.

K represents a screw-plug, closing an aperture in the main pipe directly above the partition B, which is employed for the purpose of discharging any sediment or accumulation of impure or solid matter from the pipe.

L is a plug, closing an aperture in the lowest part of the projection J, employed for like cleansing of the duct H.

The main pipe A, with its partition B, the socket E, and projection J, with their apertures at C, H, K, and L, are all cast in one piece of iron or other metal, in an inexpensive manner, and the necessary screw-threads are readily tapped in.

Operation.

The trap may be placed in any position, either vertically, horizontally, or obliquely.

The steam within the main pipe A being arrested by the partition B, is confined until it parts with its heat and condenses.

To prevent an undue accumulation of water of condensation, the plug D is adjusted so as to allow the gradual passage of water, and, by opening the plug L, or a cock used in place thereof, it can be ascertained at any time whether steam or water is passing through.

While the apparatus is in regular operation, the water is carried continuously through the duct H and aperture I, and delivered into the discharging end of the main pipe.

When it is desirable to retain the water of condensation for any purpose, instead of letting it pass off through the waste-pipe, a small spigot or other device may be inserted in place of the plug L, or the same device may be employed to permit a slight escape of steam within the apartment.

If preferred, the plug K may also be replaced by a cock.

Claims.

The following is claimed as new:

1. The partition B, duct H, and plug or valve D d, apertures C I, when combined and arranged in connection with the main pipe A, in the manner and for the purposes specified.

2. The plugs K and L, (or a cock or cocks in lieu of either or both,) in combination with the main pipe A, partition B, and duct H, substantially as and for the purposes set forth.

J. WILSON HODGES.

Witnesses:
P. H. C. STITCHER,
GEO. McCAFFRAY.